(12) United States Patent
Park et al.

(10) Patent No.: US 9,880,875 B2
(45) Date of Patent: Jan. 30, 2018

(54) APPARATUS AND METHOD FOR HARDWARE-BASED TASK SCHEDULING

(71) Applicant: Samsung Electronics Co., Ltd., Gyeonggi-do (KR)

(72) Inventors: Jongchul Park, Anyang-si (KR); Jinkyu Koo, Yongin-si (KR); Sangbok Han, Suwon-si (KR); Myungsun Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 14/692,354

(22) Filed: Apr. 21, 2015

(65) Prior Publication Data

US 2015/0301854 A1 Oct. 22, 2015

(30) Foreign Application Priority Data

Apr. 21, 2014 (KR) .......................... 10-2014-0047693

(51) Int. Cl.
*G06F 9/48* (2006.01)

(52) U.S. Cl.
CPC ...... *G06F 9/4881* (2013.01); *G06F 2209/483* (2013.01); *G06F 2209/486* (2013.01); *G06F 2209/509* (2013.01); *Y02B 60/144* (2013.01)

(58) Field of Classification Search
CPC .................................................... G06F 9/4881
USPC ......................................................... 718/102
See application file for complete search history.

(56) References Cited

U.S. PATENT DOCUMENTS

| 8,881,161 | B1 * | 11/2014 | Chudgar | G06F 9/4843 718/1 |
| 9,183,016 | B2 * | 11/2015 | Zhou | G06F 9/455 |
| 9,448,853 | B2 * | 9/2016 | Morimura | G06F 9/45533 |
| 2005/0015768 | A1 * | 1/2005 | Moore | G06F 9/4881 718/102 |
| 2012/0079494 | A1 * | 3/2012 | Sandstrom | G06F 9/4881 718/104 |
| 2014/0331233 | A1 * | 11/2014 | Matskevich | G06F 9/505 718/103 |
| 2016/0021024 | A1 * | 1/2016 | Parikh | H04L 47/823 709/226 |

OTHER PUBLICATIONS

"Shortest Job Next"; Wikipedia.org website; Apr. 11, 2014.*
"Bit Array"; Wikipedia.org website; Feb. 2, 2014.*

* cited by examiner

*Primary Examiner* — Qing Chen
*Assistant Examiner* — Clint Thatcher

(57) ABSTRACT

Provided are a method and apparatus for task scheduling based on hardware. The method for task scheduling in a scheduler accelerator based on hardware includes: managing task related information based on tasks in a system; updating the task related information in response to a request from a CPU; selecting a candidate task to be run next after a currently running task for each CPU on the basis of the updated task related information; and providing the selected candidate task to each CPU. The scheduler accelerator supports the method for task scheduling based on hardware.

18 Claims, 12 Drawing Sheets

FIG. 4

| | ID | Parent group | Priority | · · · · · |
|---|---|---|---|---|
| task { | 0 | 11 | | |
| | 1 | 12 | | |
| | 2 | 11 | | |
| | 3 | root | | |
| | ⋮ | ⋮ | | |
| | 10 | 15 | | |
| group { | 11 | root | | |
| | 12 | 11 | | |
| | ⋮ | ⋮ | | |
| | 15 | root | | |

APPARATUS AND METHOD FOR HARDWARE-BASED TASK SCHEDULING

CROSS-REFERENCE TO RELATED APPLICATION(S) AND CLAIM OF PRIORITY

The present application is related to and claims the benefit under 35 U.S.C. § 119(a) of a Korean patent application filed on Apr. 21, 2014 in the Korean Intellectual Property Office and assigned Serial No. 10-2014-0047693, the entire disclosure of which is hereby incorporated by reference.

TECHNICAL FIELD

The present application relates to an apparatus and method for hardware-based task scheduling in an electronic device. More particularly, the present disclosure relates to an apparatus and method for scheduling tasks based on hardware.

BACKGROUND

With recent advances in technologies, electronic devices have a variety of functions. For example, mobile terminals support not only communication functions for voice calls and messages but also multimedia functions for mobile TV broadcasting (e.g., Digital Multimedia Broadcasting (DMB) or Digital Video Broadcasting (DVB)), music playback (e.g., MP3 player), image capture, Internet access, and dictionary lookup. To execute various multimedia functions, efficient allocation of tasks is required. Ineffective task management may result in failure of task allocation and prevent timely execution of programs. Hence, it is necessary to develop a method enabling efficient management of tasks.

SUMMARY

To address the above-discussed deficiencies, it is a primary object to provide an improved method and apparatus for task scheduling. Another aspect of the present disclosure is to provide a new method and apparatus for scheduling tasks based on hardware. Another aspect of the present disclosure is to provide a method and apparatus for task management usable for hardware-based task scheduling.

In accordance with an aspect of the present disclosure, a method for task scheduling in a scheduler accelerator based on hardware is provided. The method includes: managing task related information based on tasks in a system; updating the task related information in response to a request from a CPU; selecting a candidate task to be run next after a currently running task for each CPU on the basis of the updated task related information; and providing the selected candidate task to each CPU.

In accordance with another aspect of the present disclosure, a scheduler accelerator based on hardware for task scheduling is provided as an apparatus. The scheduler accelerator includes: an interface module for interworking with one or more CPUs; and a task manager module to control a process of managing task related information based on tasks in a system, updating the task related information in response to a request from a CPU, selecting a candidate task to be run next after a currently running task for each CPU on the basis of the updated task related information, and providing the selected candidate task to each CPU.

In a feature of the present disclosure, it is possible to provide a method and apparatus that can efficiently schedule tasks in an electronic device.

The method and apparatus for hardware-based task scheduling improve fairness in scheduling for all tasks. As scheduling is performed by the hardware-based apparatus and the operating system uses the scheduling results, the scheduling time can be reduced. As global scheduling is used, it is unnecessary to maintain a balance for individual CPUs, increasing efficiency.

The method and apparatus for hardware-based task scheduling contributes to enhancement of overall performance and reduction of power consumption.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 depicts task related information managed by the task/group pool module according to an embodiment of the present disclosure;

DETAILED DESCRIPTION

Figure 1:
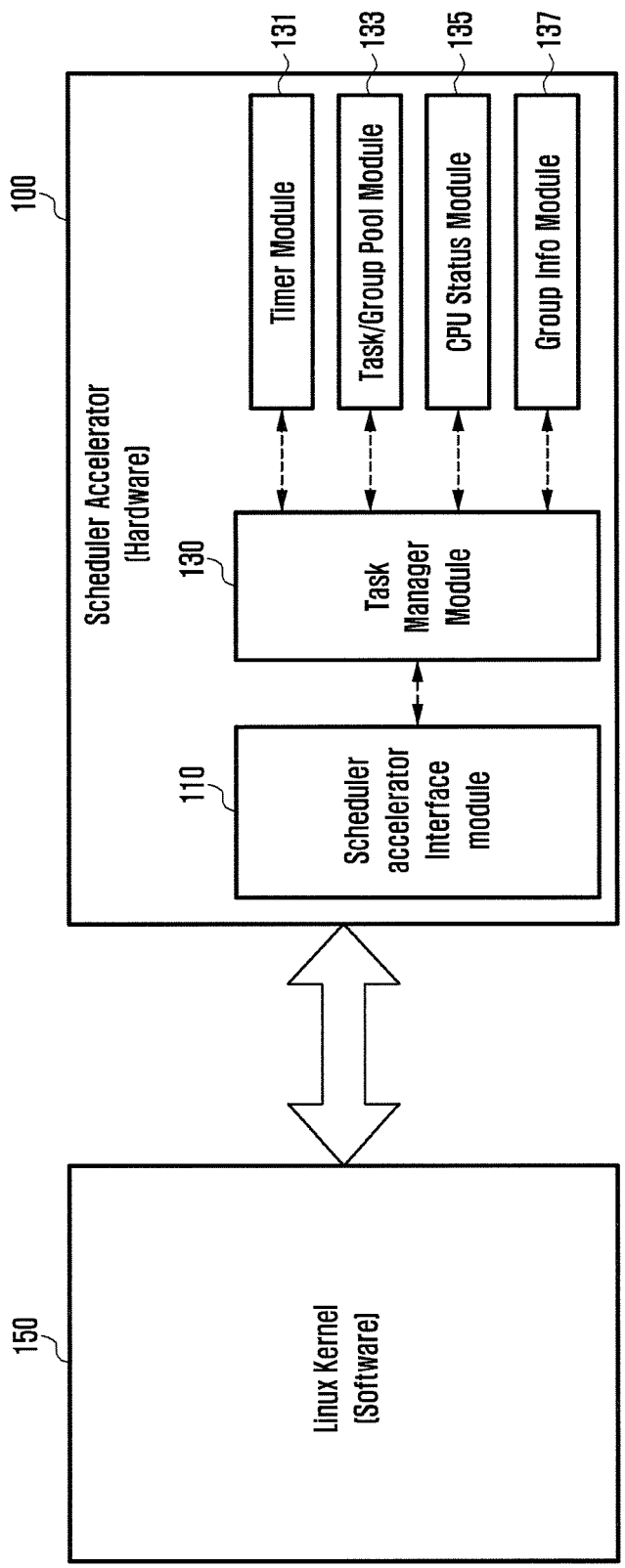
FIG. 1 illustrates a scheduler accelerator based on hardware according to an embodiment of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system. Hereinafter, various embodiments of the present disclosure are described in detail with reference to the accompanying drawings. The same or similar reference symbols are used throughout the drawings to refer to the same or like parts. The following description includes various specific details to assist in a comprehensive understanding of various embodiments of the present disclosure, but descriptions of well-known functions and constructions may be omitted for clarity and conciseness.

The present disclosure relates to a method and apparatus for accelerating task scheduling based on hardware for the operating system. In a multi-core environment, scheduling is performed on a CPU basis and load balancing is performed to balance workload among CPUs. In the present disclosure, these operations are performed through hardware so as to minimize power consumption and enhance system performance. The hardware-based accelerator can determine a task to be run next by use of information needed for scheduling among task related information provided by the system and notify this to the operating system (OS). Thereby, it is possible to accelerate scheduling.

Before a description of hardware-based scheduling, a brief description is given of OS-based scheduling. In a multi-core system, the operating system performs two scheduling activities. For each CPU (core), the scheduler determines the task to run next among runnable tasks assigned to the CPU on the basis of runtimes (or execution times) of tasks running in time-sharing mode. That is, when tasks are assigned to a specific CPU, the execution order of the tasks is determined according to priorities of the tasks assigned to the CPU. In addition, when the number of tasks assigned to one CPU is significantly different from the number of tasks assigned to another CPU, load balancing is applied to evenly distribute the tasks among all the CPUs.

In an existing multi-core operating system, a runqueue is associated with each CPU (per-CPU runqueue) to manage tasks to be run by the CPU, and a task with the shortest runtime is selected from among tasks in the runqueue. As the number of tasks to be run increases, the time required to add a task to the runqueue or to sort tasks increases. In addition, as preemption between tasks occurs in consideration of runtime fairness among tasks and priorities of tasks, task execution may be delayed.

As task scheduling is performed on a per-CPU basis, load balancing is performed to maintain overall system balance. Each core performs load balancing independently of each other. When one core has no or a small number of tasks, it may pull tasks from another core with a large number of tasks. To this end, the status of a different core is to be identified and a critical section is to be added for task migration. Although load balancing is performed, imbalance among cores may recur sometime later. Hence, when the frequency of preemption increases with the increasing scheduling time, task execution will be delayed.

Next, a description is given of an apparatus and method for hardware-based scheduling. In the present disclosure, scheduling operations in a multi-core environment are performed by hardware and the operating system uses the scheduling results, reducing the scheduling time. As global scheduling is used, load balancing between individual CPUs is not needed and a ready-to-run task is allowed to utilize available CPU resources. In addition, as CPU time is allocated to all tasks in a time-sharing manner, fairness in scheduling is increased. Hence, it is possible to enhance overall performance and reduce power consumption.

FIG. 1 illustrates a hardware-based scheduler accelerator according to an embodiment of the present disclosure. Referring to FIG. 1, the scheduler accelerator 100 based on hardware exchanges information on task scheduling with an operating system 150 such as Linux. The scheduler accelerator 100 is connected with multiple cores through a bus. The scheduler accelerator 100 includes a scheduler accelerator interface module 110 for interworking with the operating system 150, and a task manager module 130 to control overall task scheduling operations in the scheduler accelerator 100.

The scheduler accelerator 100 further includes a task/group pool module 133 to store information on tasks in the system and information on a group of one or more tasks, a CPU status management module 135 to manage information regarding a running task and a task to run next for each CPU, a timer module 131 to update the runtime of each task, and a group information module 137 to manage information on tasks ready to run. Here, the information on tasks ready to run is referred to as group information (group info). For the group information, a bitmap is used to distinguish a task or group in ready-to-run state from a task or group not in ready-to-run state. The task/group pool module 133, CPU status management module 135, timer module 131, and group information module 137 operate under the control of the task manager module 130.

In one embodiment, the task manager module 130 controls a process for managing task related information based on tasks in the system, updating the task related information in response to a request from a CPU, selecting a candidate task to run next (a task to run immediately after the currently running task) for each CPU on the basis of the updated task related information, and notifying the selection result to each CPU.

The task related information includes at least one of task/group pool information regarding all tasks in the system and groups of tasks, group information used to manage tasks ready to run, information on runtimes of individual tasks, and task status information regarding a currently running task and candidate task for each CPU. Here, the group information is represented by a bitmap whose bits indicate ready-to-run states of all tasks and groups in the system.

In addition, the task manager module 130 controls a process for finding ready-to-run tasks from the group information through bitmap operation, and selecting a task with the shortest runtime from among the ready-to-run tasks as the candidate task.

The task manager module 130 controls a process of checking whether the task selected as having the shortest runtime is a group, determining, if the selected task is not a group, the selected task as the candidate task for each CPU, and selecting, if the selected task is a group, a task with the shortest runtime from among tasks in the group as the candidate task.

When a task creation request is received from a CPU, the task manager module 130 controls an operation to update the task/group pool information on the basis of a task ID contained in the task creation request.

When a task enqueue request is received from a CPU, the task manager module 130 controls a process for updating bit information of the group information on the basis of a task ID contained in the task enqueue request, checking whether the parent group of the task ID is the root group, updating, if the parent group is not the root group, bit information of the group information for the parent group until the parent group becomes the root group.

When a task dequeue request is received from a CPU, the task manager module 130 controls a process for updating bit information of the group information on the basis of a task ID contained in the task dequeue request, checking whether no task in the parent group of the task ID is ready to run, terminating, if at least one task in the parent group is ready to run, update of the group information, and continuing, if no task in the parent group is ready to run, update of the group information and checking until the parent group becomes the root group.

When the candidate task is selected by a CPU, the task manager module 130 controls a process for emptying the candidate task field of the task status information, and selecting a new candidate task to update the candidate task field of the task status information.

When a selected task has CPU-affinity (the task is to be run on a particular CPU), the task manager module 130 controls a process for finding a task with the shortest runtime from among tasks having an affinity for the CPU, finding a task with the shortest runtime from among tasks without CPU-affinity, and selecting the one with a shorter runtime of the found tasks with CPU-affinity and without CPU-affinity as the candidate task.

In the above description, the scheduler accelerator 100 is depicted as having multiple blocks. However, this is for ease of description only, and the scheduler accelerator 100 is not limited to such a configuration. For example, a control unit composed of the task manager module 130, the task/group pool module 133, the CPU status management module 135, the timer module 131 and the group information module 137 control the overall operation of the scheduler accelerator 100. The task manager module and control unit controls not only operations described in connection with FIG. 2 but also scheduling operations described in connection with FIGS. 2 to 12.

Figure 2:
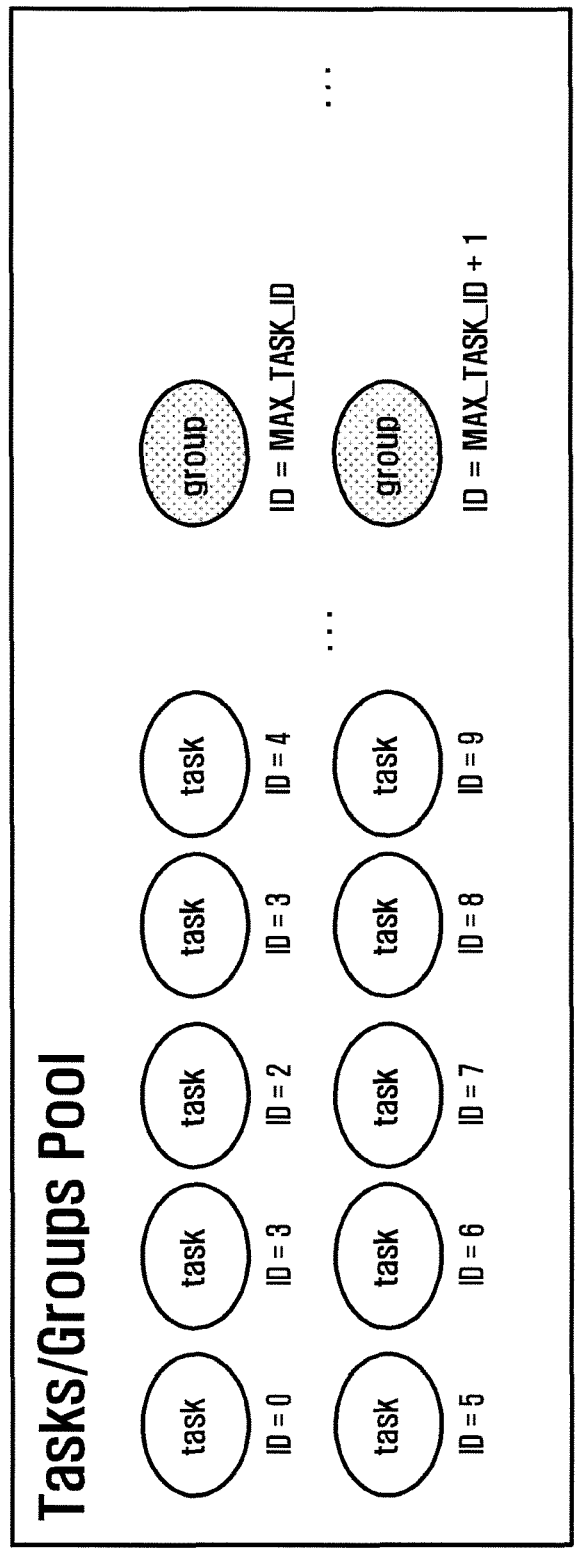
FIG. 2 depicts a task/group pool module according to an embodiment of the present disclosure.

FIG. 2 depicts a task/group pool module according to an embodiment of the present disclosure. Referring to FIG. 2, the task/group pool module stores information on all tasks in the system from creation to termination. Task IDs are assigned for rapid access to the task related information. Task IDs are assigned to tasks in order of creation by use of a software mechanism. In FIG. 2, each task has an assigned ID, and a task with a small ID is created earlier than a task with a large ID. A task is associated with information on a group to which the task belongs.

The operating system controls the runtime of specific tasks as a group. Here, the group information is used to represent information on groups. For rapid access to the group information, an ID is assigned to each group. Here, group IDs and task IDs are different and are assigned differently. The operating system utilizes a group of one or more tasks as an allocation unit for work. That is, a group serves as an allocation unit for work. A group is not an actual unit for execution and contains information on tasks. The relationship between a task and a group in the present disclosure can be similar to the relationship between a task and a group in a typical operating system. In the following description, the relationship between a task and a group is described on the basis of the runtime of the task. However, the present disclosure is not limited thereto or thereby.

Figure 3:
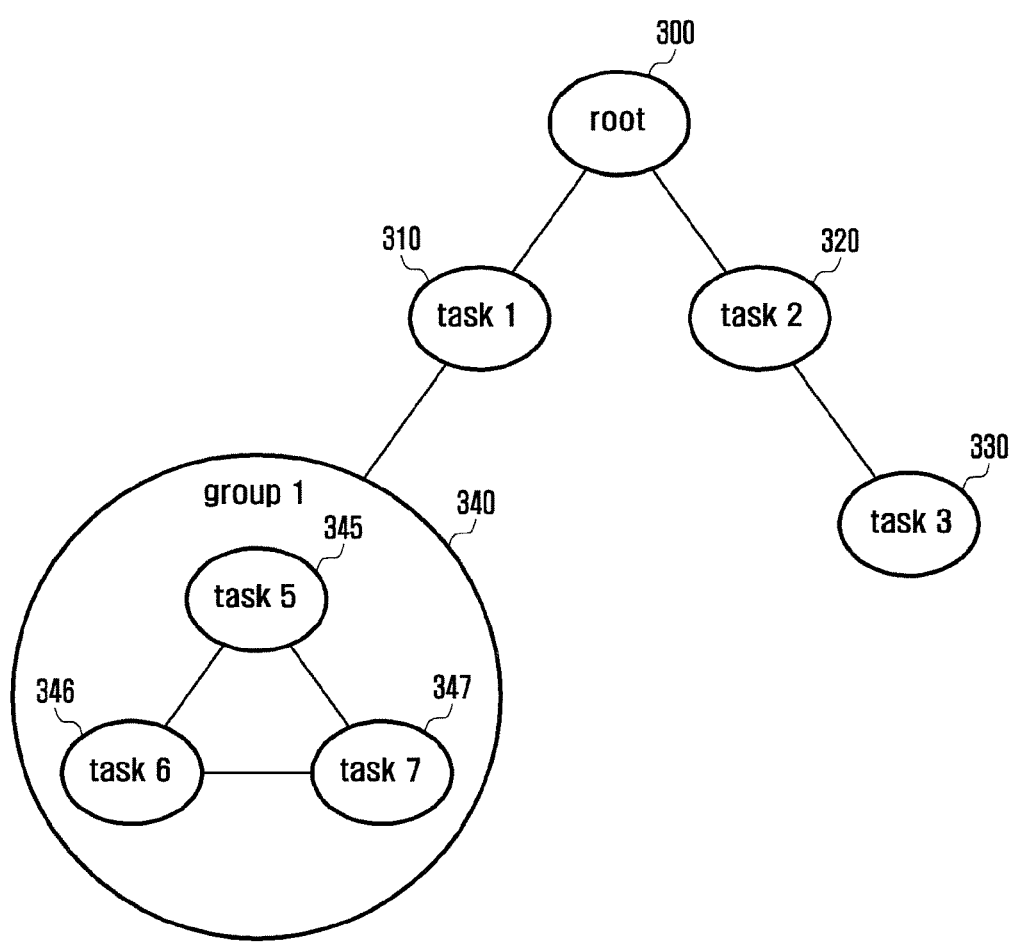
FIG. 3 illustrates a relationship between tasks and groups according to an embodiment of the present disclosure.

A more detailed description is given of the group with reference to FIG. 3. A group contains at least one task. In FIG. 3, a first group 340 (group 1) is composed of three tasks 345, 346 and 347. A group is treated as a task whose allocated time is the same as that of other tasks at the same level. In other words, when a higher-level group is composed of a lower-level group and a task, the lower-level group is treated as another task at the same level when viewed from the higher-level group. For example, in FIG. 3, the root group 300 can be considered as containing four tasks 310, 320, 330 and 340 whose allocated times are equal to each other. Here, although the first group 340 is a group, it may be treated as a task whose allocated time is the same as that of the three tasks 310, 320 and 330 when viewed from the root group 300. For example, assume that the tasks 310, 320, 330 and 340 each have an allocated time of 3 seconds. Then, the first group 340 composed of multiple tasks has an allocated time of 3 seconds. Multiple tasks 345, 346 and 347 contained in the first group 340 each have the same allocated time with respect to the first group 340. Hence, the tasks 345, 346 and 347 of the first group 340 each have an allocated time of 1 second. In addition, although the task 345 is a task when viewed from the first group 340, it may actually be a group composed of one or more tasks.

FIG. 4 depicts task related information managed by the task/group pool module according to an embodiment of the present disclosure. Referring to FIG. 4, the task related information are composed of fields for task or group IDs, parent groups of tasks, priorities of tasks, and CPU affinity. Other task related information can be further included. When multiple tasks compete for execution, priorities of the tasks are used to determine the execution order of the tasks. A parent group is a higher level group. For example, task 0 and task 2 are tasks belonging to group 11; task 1 is a task belonging to group 12; and task 10 is a task belonging to group 15. A group can have a parent group. The parent group of group 11 is the root group. Group 12 belongs to group 11, and group 15 belongs to the root group. As described above, the task/group pool module stores and manages information regarding task and group IDs, parent groups, and priorities.

The timer module is used to calculate and update the runtime of each task. In one embodiment of the present disclosure, a task with the shortest runtime is selected as the next task for scheduling.

Figure 5:
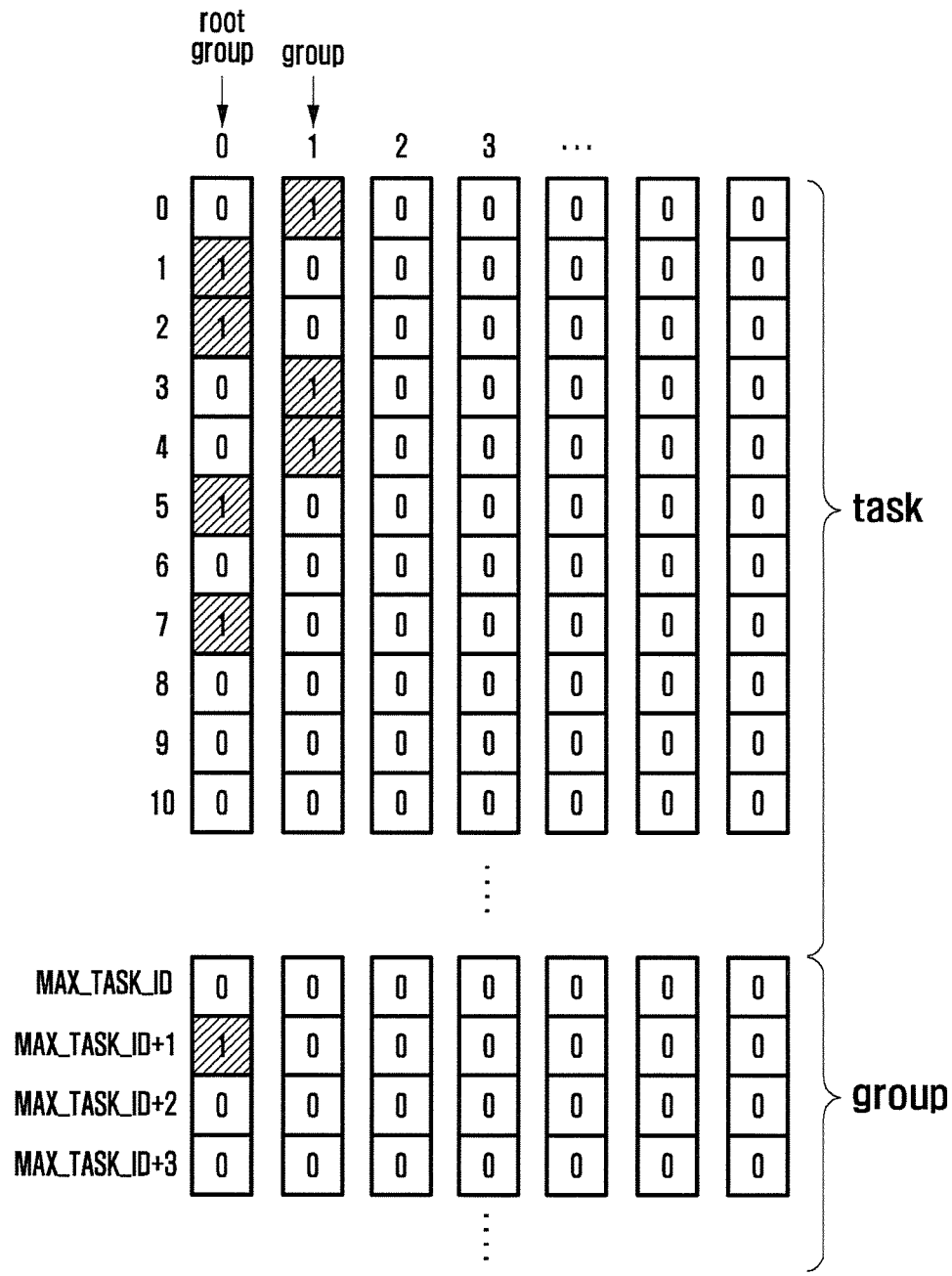
FIG. 5 depicts group information according to an embodiment of the present disclosure.

FIG. 5 depicts group information according to an embodiment of the present disclosure. Referring to FIG. 5, the group information managed by the group information module includes bitmaps whose sizes correspond to the number of all tasks and groups. The ID of a group has the same offset as the ID of the group information, a particular group is easily accessed using the offset.

The group information is used to manage groups of tasks and includes an array of bitmaps where the array size (number of bitmaps) corresponds to the number of groups. The group information module manipulates individual bits of the bitmap according to settings. When a task or group is ready to run, the corresponding bit may be set to 1; and when a task or group is not ready to run, the corresponding bit may be set to 0.

In FIG. 5, among tasks belonging to the root group, a task whose corresponding bit is set to 1 (task 1, 2, 5 or 7) is a ready-to-run task. Group "max_task_id+1" is also ready to run. The task manager module treats the above four tasks and one group as tasks at the same level and selects the one with the shortest runtime among the five tasks. For example, assume that group "max_task_id+1" has the shortest runtime. Then, a task ready to run is examined in group 1, which corresponds to group "max_task_id+1". Here, a task whose corresponding bit is set to 1 (task 0, 3 or 4) in the bitmap of group 1 is a ready-to-run task. Among these tasks, a task with the shortest runtime is selected as the candidate task to run next for each core. The task manager module returns the ID of the selected task as a notification to the candidate task to run next. In the event that the task with the shortest runtime is a group, the above procedure is repeated until a group other than a group is finally selected. In the present disclosure, the group information is managed through bitmaps as shown in FIG. 5. This bitmap information enables rapid search for a ready-to-run task among tasks belonging to each group by use of bitwise operations. Thereby, it is possible to reduce the scheduling time and enhance system efficiency.

Figure 6:
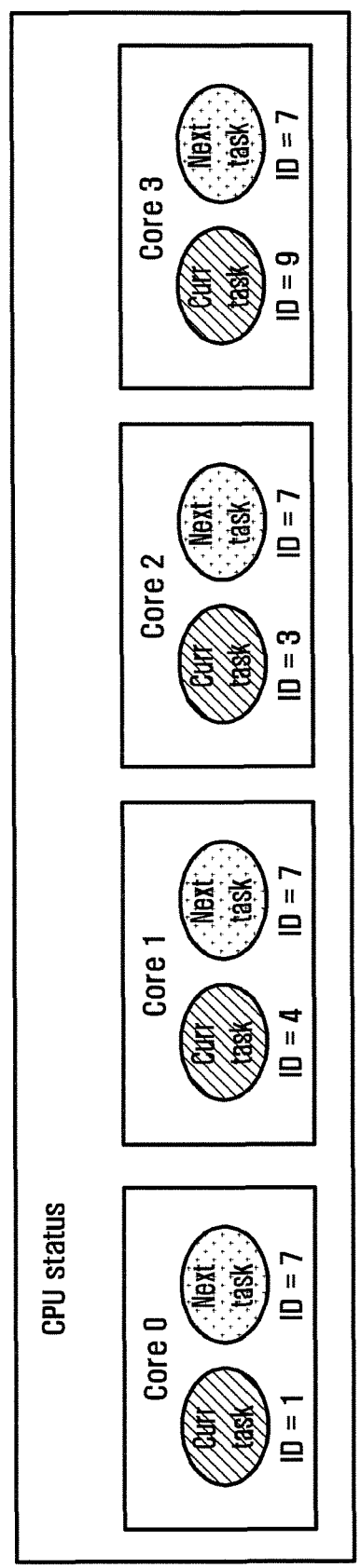
FIG. 6 depicts a CPU status module according to an embodiment of the present disclosure.

FIG. 6 depicts a CPU status module according to an embodiment of the present disclosure. Referring to FIG. 6, the CPU status module manages information regarding a task being run and a task to run next for each CPU or core. In FIG. 6, the system has four cores (core 0, core 1, core 2 and core 3). The CPU status module manages information on the current task and information on the next task for each core. Here, as global scheduling is used in the present disclosure, the next task for each core can be the same (e.g. task 7). That is, for each core, while the current task is different, the next task can be the same.

At some time later, when the current task is cleared from a core (e.g. core 3), the core issues a task request. Here, core 3 reads and executes task 7 configured as the next task. When task 7 is read, the CPU status module clears the next task for each core, and selects a new candidate task to configure the newly selected task as the next task. As described above, whenever the next task for a core is cleared, the CPU status module clears the next task for each core and selects a new task as the next task. As the core or CPU that actually reads the next task is not known in advance, the CPU status module may be required to manage information on the current task and the next task for each core.

Meanwhile, when tasks have affinity to particular cores, the next task for one core is different from that for another core. As the next tasks for individual cores may differ from each other, it is effective to manage the current and next tasks on a per-core basis. Affinity handling is described in more detail later.

Next, operations of the scheduler accelerator are described with reference to FIGS. 7 to 12. In the following description, it is assumed that these operations are controlled by a control unit or task manager module of the scheduler accelerator.

Figure 7:
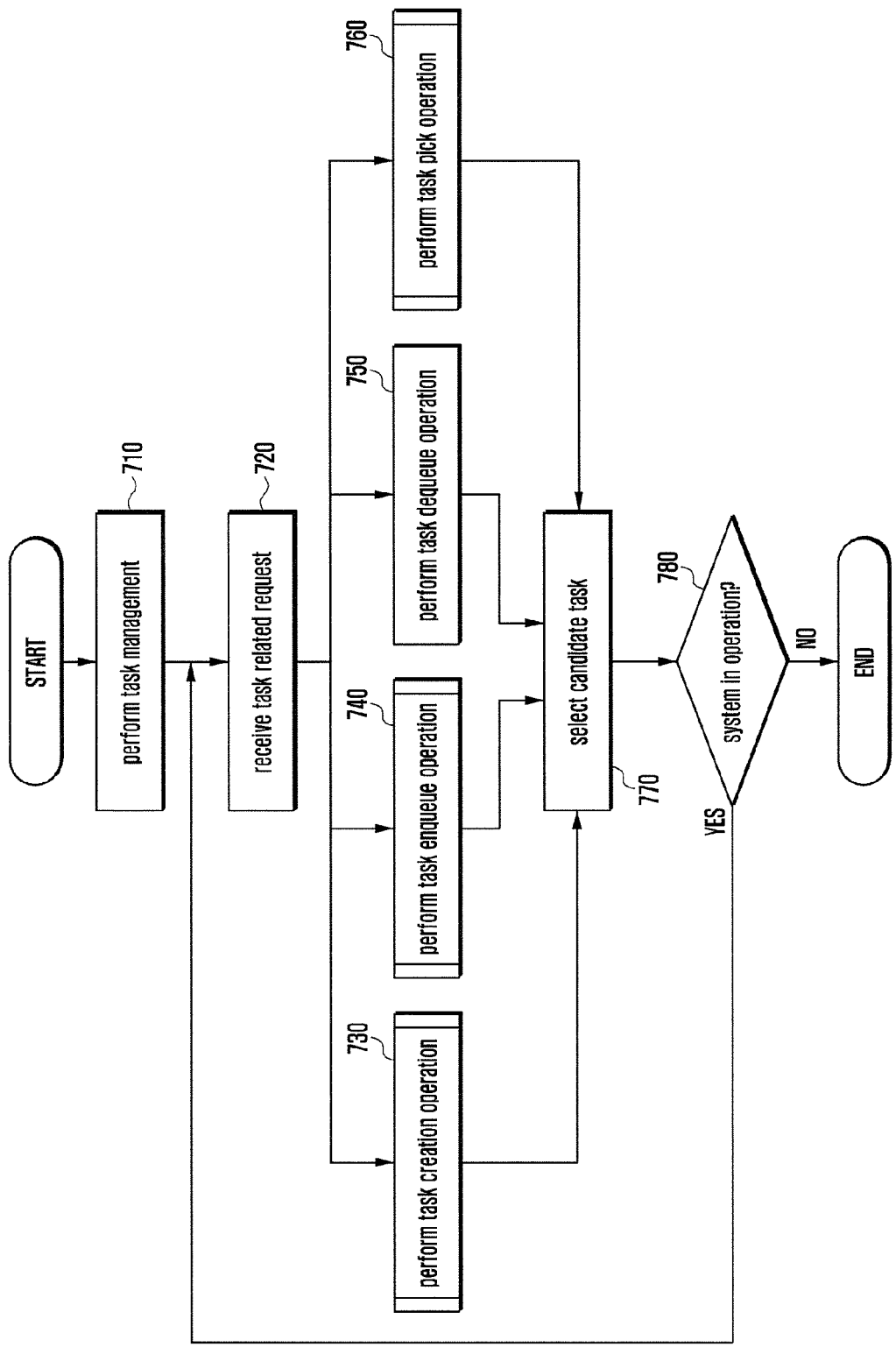
FIG. 7 is a flowchart of a scheduling method according to an embodiment of the present disclosure.

FIG. 7 is a flowchart of a scheduling method according to an embodiment of the present disclosure. Referring to FIG. 7, at step 710, the scheduler accelerator performs task management when the system operates. In the present disclosure, task scheduling, which is performed by the operating system in the related art, is performed by a hardware-based scheduler accelerator. Hence, while the system is working, the hardware-based scheduler accelerator manages tasks through scheduling operations.

At step 720, the scheduler accelerator receives a task related request from the operating system. Here, the task related request is a task creation request, a task enqueue request, a task dequeue request, or a task pick request. The task creation request is a request for updating the task related information and scheduling information corresponding to a specified task ID. The task enqueue request is a request for adding a task to the runqueue, causing the scheduling information to be updated. The task dequeue request is a request for removing a task from the runqueue, causing the scheduling information to be updated. The task pick request is a request for task assignment issued by the operating system when a CPU is idle.

Upon reception of a task related request, the next step is determined according to the type of the task related request. Specifically, if the task related request is a task creation request, the procedure proceeds to step 730 for task creation operation. If the task related request is a task enqueue request, the procedure proceeds to step 740 for task enqueue operation. If the task related request is a task dequeue request, the procedure proceeds to step 750 for task dequeue operation. If the task related request is a task pick request, the procedure proceeds to step 760 for task pick operation. Thereafter, at step 770, the scheduler accelerator selects a candidate task and a task to run.

Steps 730 to 770 are described in more detail later with reference to FIGS. 8 to 12. The group information is updated at steps 730 to 750 and used to select a candidate task at step 770. The candidate task selected at step 770 is used to select a task to run at step 760.

At step 780, the scheduler accelerator checks whether the system is still in operation. If the system is in operation, the procedure returns to step 720 at which the scheduler accelerator continues to receive and process a task related request as described above. If the system is not in operation, the procedure ends.

Figure 8:
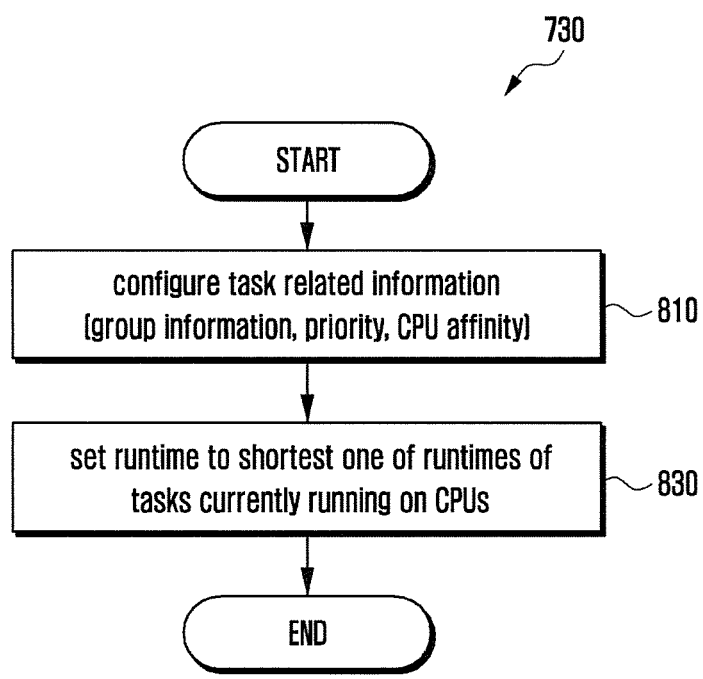
FIG. 8 is a flowchart for task creation operation according to an embodiment of the present disclosure.

FIG. 8 is a flowchart for task creation operation according to an embodiment of the present disclosure. Referring to FIG. 8, upon reception of a task creation request, at step 810, the scheduler accelerator updates the fields of the task/group pool information corresponding to a task ID contained in the task creation request. Here, the scheduler accelerator updates information on the parent group of the task, priority, and CPU affinity.

At step 830, the scheduler accelerator sets the runtime of the task having the ID to the shortest one of runtimes of tasks currently running on the CPUs. Runtime information is used to determine a task to be allocated by the operating system. The task with the shortest runtime among tasks at the same level can be configured as a candidate for the next task to be allocated by the operating system.

Figure 9:
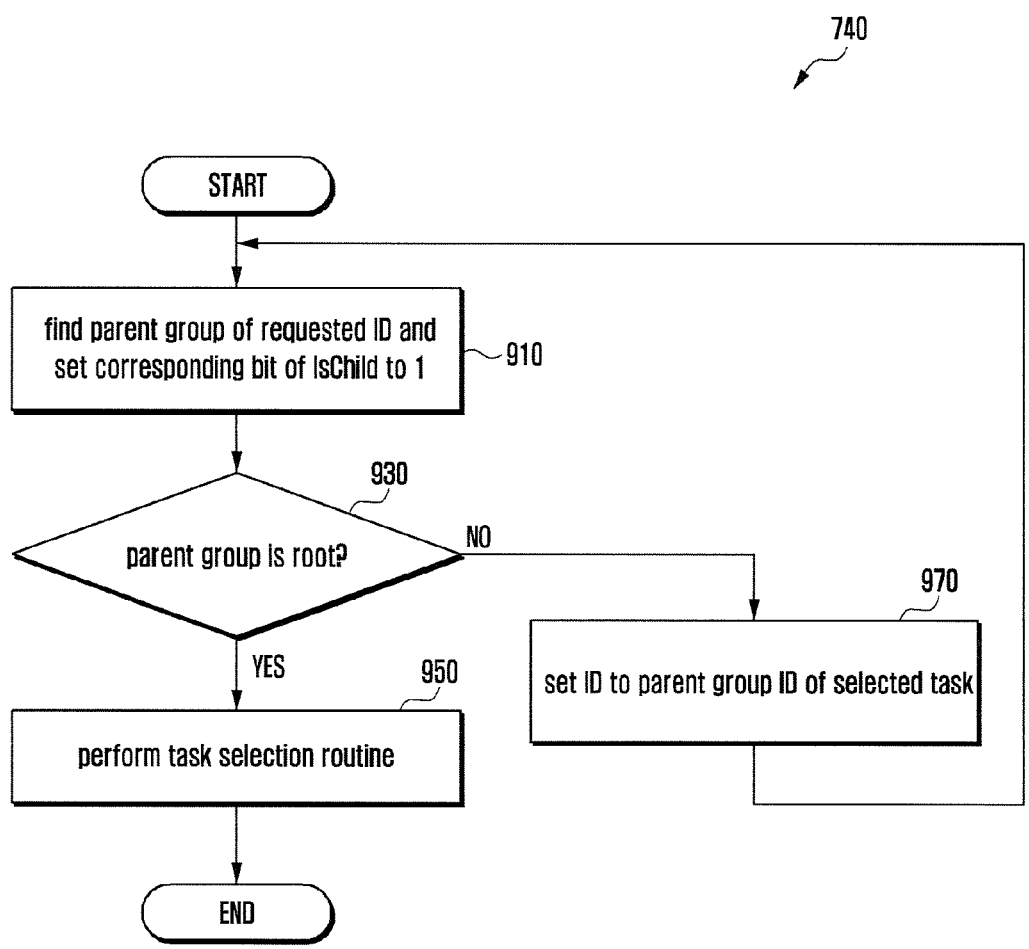
FIG. 9 is a flowchart for task enqueuing operation according to an embodiment of the present disclosure.

FIG. 9 is a flowchart for task enqueuing operation according to an embodiment of the present disclosure. Referring to FIG. 9, when a task in the task/group pool information becomes ready to run, the task and corresponding group is added to the runqueue. Upon reception of a task enqueue request, at step 910, the scheduler accelerator sets the bit of the group information corresponding to the requested ID to 1 (here, it is assumed that presence in the runqueue is indicated by '1' and absence from the runqueue is indicated by '0').

At step 930, the scheduler accelerator determines whether the parent group of the task with the ID is the root group. The root group is the highest-level one among groups of tasks. If the parent group is the root group, the procedure proceeds to step 950; and, if the parent group is not the root group, the procedure proceeds to step 970.

Upon determining that the parent group is the root group, at step 950, as the requested task is added to the runqueue, the scheduler accelerator performs task selection. Among tasks whose corresponding bit in the group information is set to 1 (newly added task plus previously added tasks), the task with the shortest runtime replaces the next task of the CPU status management module. Here, the next task is referred to as the candidate task. The candidate task is a task to be allocated in response to a task allocation request from the operating system.

Upon determining that the parent group is not the root group, at step 970, as the requested task is not finally added to the runqueue, the scheduler accelerator sets the ID to the ID of the parent group of the current task. Here, the task can be a group. That is, if the task is not a group, the parent group would have been determined as the root group at step 930. Thereafter, the procedure returns to step 910 at which, as the ID is changed to the parent group ID, the scheduler accelerator sets the bit of the group information corresponding to the changed ID (parent group ID) to 1. Steps 970 and 910 are repeated until the parent group equals the root group, and then task selection is performed at step 950.

Task dequeue operation corresponds to the opposite of task enqueue operation. Upon reception of a task dequeue request, the scheduler accelerator sets the bit of the group information corresponding to the requested ID (of a task to be removed from the runqueue) to 0. When no task in the current group is ready to run, the bit of the group information corresponding to the parent group is set to 0. This step is repeated until the parent group equals the root group. When at least one task in the current group is ready to run, the bit of the group information corresponding to the parent group is not changed ('1') and group information update ends.

Figure 10:
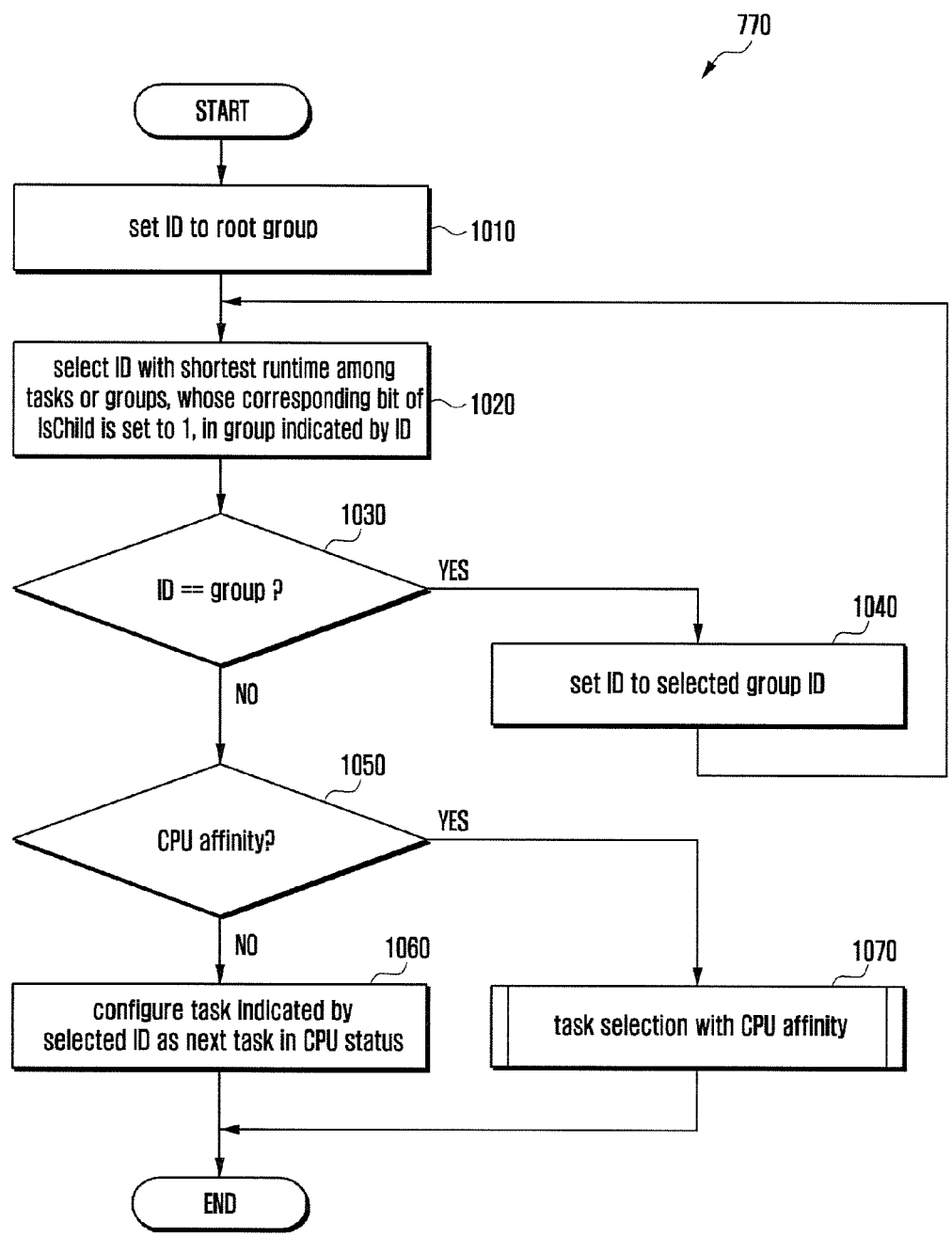
FIG. 10 is a flowchart for candidate task selection according to an embodiment of the present disclosure.

FIG. 10 is a flowchart for candidate task selection according to an embodiment of the present disclosure. Referring to FIG. 10, candidate task selection begins with the root group. At step 1010, the scheduler accelerator sets the current ID to the root group.

At step 1020, the scheduler accelerator of the group information selects a task with the shortest runtime among tasks or groups, whose corresponding bit of the group information is set to 1, in the group indicated by the current ID, and sets the current ID to the ID of the selected task.

At step 1030, the scheduler accelerator checks whether the current ID is a group ID. If the current ID is a group ID, the procedure proceeds to step 1040. If the current ID is a task ID (not a group ID), the procedure proceeds to step 1050, at which the task indicated by the current ID is selected as the next task (candidate task) in the CPU status information.

At step 1040, the scheduler accelerator sets the current ID to the ID of the selected group. Then, the procedure returns to step 1020. This process is repeated until the current ID is a task ID. The task indicated by the current ID is selected as the next task (candidate task) in the CPU status information. Here, as the selected task can be run on all CPUs, the next task for all CPUs indicates the same ID in the CPU status information.

At steps 1050 to 1070, CPU affinity is handled. At step 1050, the scheduler accelerator checks whether the task indicated by the current ID has CPU affinity. When a task is configured to execute on or has a preference for a particular CPU, the task is described as having an affinity for the CPU.

If the task indicated by the current ID has no CPU affinity, the procedure proceeds to step 1060; and, if the task indicated by the current ID has CPU affinity, the procedure proceeds to step 1070. At step 1060, the scheduler accelerator configures the task indicated by the current ID as the candidate task in the CPU status information. At step 1070, to handle CPU affinity, a candidate task is selected for each CPU. Step 1070 is described in more detail in FIG. 12.

Figure 11:
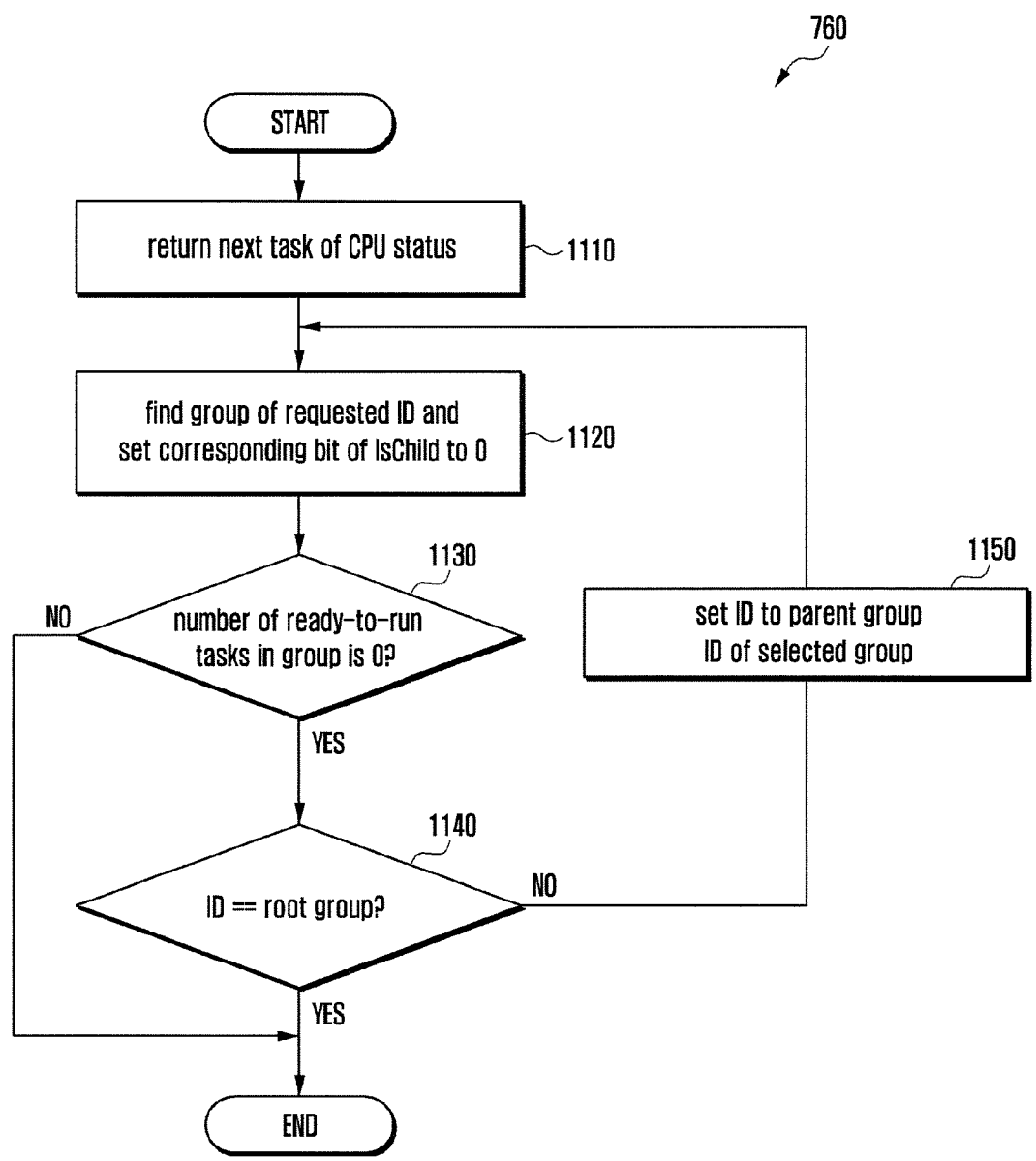
FIG. 11 is a flowchart for task selection for execution according to an embodiment of the present disclosure.

FIG. 11 is a flowchart for task selection for execution according to an embodiment of the present disclosure. Referring to FIG. 11, at step 1110, the scheduler accelerator returns the candidate task in the CPU status information in response to a task execute request from a CPU. The candidate task field in the CPU status information is cleared.

When the next task or candidate task in the CPU status information is selected by a CPU, after initializing the current ID to the selected task, at step 1120, the scheduler accelerator sets the bit in the group information corresponding to the current ID to 0.

At step 1130, the scheduler accelerator determines whether the number of ready-to-run tasks in the group containing the task indicated by the current ID is 0. If the number of ready-to-run tasks in the group is not 0, as a ready-to-run task is present in the group, the procedure ends without changing the group information. If the number of ready-to-run tasks in the group is 0, the procedure proceeds to step 1140. At step 1140, the scheduler accelerator checks whether the group ID indicates the root group. If the group ID indicates the root group, as there is no more higher level group, the procedure ends. If the group ID does not indicate the root group, the procedure proceeds to step 1150. At step 1150, the scheduler accelerator sets the current ID to the ID of the parent group of the group. Then, the procedure returns to step 1120. This may be repeated until the group ID indicates the root group.

As the candidate task is cleared in the CPU status information, a new candidate task is selected through candidate task selection operation. After the candidate task is selected by a CPU for execution, a new candidate task is selected. That is, when the candidate task is selected by a CPU, the candidate task fields for all CPUs are cleared and the candidate task selection operation is initiated to select a new candidate task.

Figure 12:
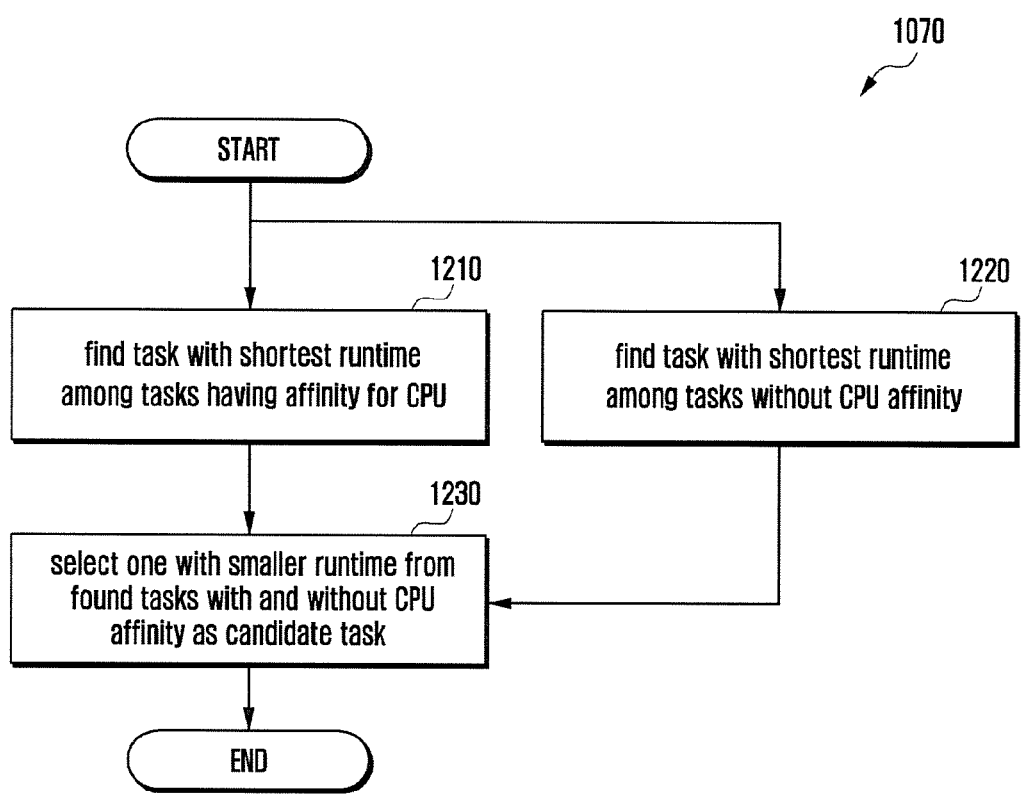
FIG. 12 is a flowchart for task selection with CPU affinity according to an embodiment of the present disclosure.

FIG. 12 is a flowchart for task selection with CPU affinity according to an embodiment of the present disclosure. When a task selected as the candidate task for execution has CPU affinity, the selected task cannot become the candidate task for all CPUs in the CPU status information. That is, when the selected task is affine for a first CPU, it can be set as the candidate task for the first CPU but may not be set as the candidate task for a second CPU. In this case, it is necessary to separately select a different candidate task for the second CPU.

Referring to FIG. 12, task selection with CPU affinity is handled in two stages. At step 1210, the scheduler accelerator finds tasks having CPU affinity for the corresponding CPU. A task may or may not have an affinity with the CPU. The scheduler accelerator finds a task with the shortest runtime from among tasks having an affinity for the CPU. At step 1220, the scheduler accelerator finds a task with the shortest runtime from among tasks without CPU affinity.

At step 1230, the scheduler accelerator selects the one with the smaller runtime from the found tasks with and without CPU affinity as the candidate task for the corresponding CPU. When two tasks are not found, only a single value may be stored.

As described above, a description is given of the method and apparatus for accelerated scheduling based on hardware. In embodiments of the present disclosure, task management, which is performed by the operating system in the related art, is performed by hardware and the operating system uses scheduling results produced by a scheduler accelerator. To reduce unnecessary operations and rapid access to data in hardware, scheduling related data is managed in the form of bitmaps. In the related art, with the increasing number of tasks to run, scheduling overhead increases and the frequency of preemption between tasks increases, causing delay of task execution. In the present disclosure, as scheduling operations are performed by hardware, the scheduling time can be shortened and the frequency of preemption can be reduced in comparison with the related-art case where scheduling is performed by the operating system. As global scheduling other than existing per-CPU scheduling is used, load balancing is not needed. As fairness between all tasks in the system is ensured, it is possible to enhance overall system performance.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for task scheduling in a scheduler accelerator based on hardware, the method comprising:
    managing task related information on runtimes of tasks based on tasks in a system;
    receiving a task enqueue request for a first task;
    updating the task related information for the first task;
    identifying a parent group of the first task;
    determining whether the parent group of the first task is included in a higher group;
    if the parent group is included in the higher group, updating the task related information for the parent group and identifying the higher group of the parent group;
    if the parent group is not included in the higher group, selecting a candidate task to be run next after a currently running task for each CPU based on the updated task related information, a task with a shortest runtime among a plurality of tasks being selected as the candidate task; and
    providing the selected candidate task to each CPU.

2. The method of claim 1, wherein the task related information comprises at least one of task/group pool information regarding the tasks in the system and groups of tasks, group information used to manage tasks ready to run, or task status information regarding a currently running task and candidate task for each CPU.

3. The method of claim 1, wherein bits in a bitmap indicate ready-to-run states of the tasks and at least one group.

4. The method of claim 1, the method further comprising:
    finding ready-to-run tasks from group information through bitmap operation; and
    wherein the task with the shortest runtime is selected from among the ready-to-run tasks as the candidate task.

5. The method of claim 4, further comprising:
    checking whether the task selected as having the shortest runtime is a group;
    determining, when the selected task is not a group, the selected task as the candidate task for each CPU; and
    selecting, when the selected task is a group, a task with the shortest runtime from among tasks in the group as the candidate task.

6. The method of claim 2, further comprising:
    receiving a task creation request from the CPU; and
    updating the task/group pool information based on a task ID contained in the task creation request.

7. The method of claim 2, further comprising:
    receiving a task dequeue request from the CPU;
    updating bit information of the group information based on a task ID contained in the task dequeue request;
    checking whether no task in a parent group of the task ID is ready to run;
    terminating, when at least one task in the parent group is ready to run, update of the group information; and
    continuing, when no task in the parent group is ready to run, updating and checking until the parent group becomes a root group.

8. The method of claim 2, further comprising:
    clearing, when the candidate task is selected by a CPU, a candidate task field of the task status information; and
    selecting a new candidate task to update the candidate task field of the task status information.

9. The method of claim 4, wherein selecting a candidate task to be run next comprises:
    checking whether the selected task has an affinity for a particular CPU; and
    controlling, when the selected task has CPU affinity, a process of finding a task with the shortest runtime from among tasks having an affinity for the CPU, finding a task with the shortest runtime from among tasks without CPU-affinity, and selecting the one with a shorter runtime of the found tasks with CPU-affinity and without CPU-affinity as the candidate task.

10. A scheduler accelerator based on hardware for task scheduling, comprising:
    an interface configured to interwork with one or more central processing units (CPUs); and
    a task manager processor, electrically coupled to the interface, configured to:
        manage task related information on runtimes of tasks based on tasks in a system,
        receive a task enqueue request for a first task from a CPU,
        update the task related information for the first task,
        identify a parent group of the first task,
        determine whether the parent group of the first task is included in a higher group,
        if the parent group is included in the higher group, updating the task related information for the parent group and identifying the higher group of the parent group,
        if the parent group is not included in the higher group, select a candidate task to be run next after a currently running task for each CPU based on the updated task related information, a task with a shortest runtime among a plurality of tasks being selected as the candidate task, and
        provide the selected candidate task to each CPU.

11. The scheduler accelerator of claim 10, wherein the task related information comprises at least one of: task/group pool information regarding the tasks in the system and groups of tasks, group information used to manage tasks ready to run, or task status information regarding a currently running task and candidate task for each CPU.

12. The scheduler accelerator of claim 10, wherein bits in a bitmap indicate ready-to-run states of the tasks and at least one group.

13. The scheduler accelerator of claim 10, wherein the task manager processor is configured to:
    find ready-to-run tasks from group information through bitmap operation, and
    wherein a task with the shortest runtime is selected from among the ready-to-run tasks as the candidate task.

14. The scheduler accelerator of claim 13, wherein the task manager processor is configured to:

check whether the task selected as having the shortest runtime is a group, determine when the selected task is not a group, the selected task as the candidate task for each CPU, and select, when the selected task is a group, a task with the shortest runtime from among tasks in the group as the candidate task.

15. The scheduler accelerator of claim 11, wherein the task manager processor is further configured to:

receive a task creation request from the CPU, and update the task/group pool information based on a task ID contained in the task creation request.

16. The scheduler accelerator of claim 11, wherein the task manager processor is further configured to:

receive a task dequeue request from the CPU, update bit information of the group information based on a task ID contained in the task dequeue request, check whether no task in a parent group of the task ID is ready to run, terminate, when at least one task in the parent group is ready to run, update of the group information, and continue, when no task in the parent group is ready to run, updating and checking until the parent group becomes a root group.

17. The scheduler accelerator of claim 11, wherein, when the candidate task is selected by a CPU, the task manager processor is configured to:

clear a candidate task field of the task status information, and select a new candidate task to update the candidate task field of the task status information.

18. The scheduler accelerator of claim 13, wherein the task manager processor is configured to:

check whether the selected task has an affinity for a particular CPU, and control, when the selected task has CPU affinity, a process for finding a task with the shortest runtime from among tasks having an affinity for the CPU, finding a task with the shortest runtime from among tasks without CPU-affinity, and selecting the one with a shorter runtime of the found tasks with CPU-affinity and without CPU-affinity as the candidate task.

\* \* \* \* \*